(12) United States Patent
Francis et al.

(10) Patent No.: US 10,776,576 B2
(45) Date of Patent: Sep. 15, 2020

(54) AUTOMATED MOBILE DEVICE DETECTION

(71) Applicant: INTERNATIONAL BUSINESS MACHINES CORPORATION, Armonk, NY (US)

(72) Inventors: Timothy M. Francis, Newmarket (CA); Marco A. Deluca, Maple (CA); Brian W. Thomson, Unionville (CA); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/814,759

(22) Filed: Nov. 16, 2017

(65) Prior Publication Data

US 2019/0147023 A1    May 16, 2019

(51) Int. Cl.
| | |
|---|---|
| *G06F 3/00* | (2006.01) |
| *G06F 40/197* | (2020.01) |
| *G06F 16/958* | (2019.01) |
| *G06F 16/957* | (2019.01) |
| *G06F 16/9535* | (2019.01) |
| *G06F 16/9537* | (2019.01) |
| *H04W 4/02* | (2018.01) |

(52) U.S. Cl.
CPC .......... *G06F 40/197* (2020.01); *G06F 16/958* (2019.01); *G06F 16/9535* (2019.01); *G06F 16/9537* (2019.01); *G06F 16/9577* (2019.01); *H04W 4/02* (2013.01)

(58) Field of Classification Search
CPC .. G06F 16/958; G06F 16/9577; G06F 40/197; G06F 16/9535; G06F 16/9537; H04W 4/02
See application file for complete search history.

(56) References Cited

U.S. PATENT DOCUMENTS

| | | | |
|---|---|---|---|
| 6,912,386 B1 | 6/2005 | Himberg et al. | |
| 8,306,508 B1 | 11/2012 | Lundy et al. | |
| 9,699,490 B1* | 7/2017 | Japp | H04N 21/251 |
| 2005/0038827 A1* | 2/2005 | Hooks | G06F 11/0748 |

(Continued)

FOREIGN PATENT DOCUMENTS

| | | |
|---|---|---|
| WO | 2105148906 | 10/2015 |
| WO | 2016060637 | 4/2016 |

OTHER PUBLICATIONS

Gupta, Mona et al; Characterizing Comparison Shopping Behavior: A Case Study; 2014 IEEE 30th International Conference on Data Engineering Workshops; Mar. 31-Apr. 4, 2014; pp. 115-122.

(Continued)

*Primary Examiner* — Kyle R Stork
(74) *Attorney, Agent, or Firm* — Schmeiser, Olsen & Watts; Michael A. Petrocelli

(57) ABSTRACT

A method and system for improving an automated mobile device detection system is provided. The method includes automatically detecting Web pages being accessed by a user via a mobile hardware device. Movement based attributes, biological parameters, and a geographical location of the user are detected via hardware sensors of the mobile device. The Webpages are modified such that a modified plurality of Webpages is generated based on the analysis. The modified plurality of Webpages is presented to the user.

18 Claims, 5 Drawing Sheets

(56) References Cited

U.S. PATENT DOCUMENTS

| | | |
|---|---|---|
| 2007/0300185 A1* | 12/2007 | Macbeth ................ G06F 9/451 |
| | | 715/825 |
| 2009/0002178 A1 | 1/2009 | Guday et al. |
| 2010/0042469 A1 | 2/2010 | Chandrasekar et al. |
| 2012/0095976 A1 | 4/2012 | Hebenthal et al. |
| 2013/0225261 A1 | 8/2013 | Cruz-Hernandez |
| 2014/0236777 A1 | 8/2014 | Bhogal et al. |
| 2015/0165327 A1 | 6/2015 | Chu et al. |
| 2018/0284100 A1* | 10/2018 | Agu ................... G01N 33/4972 |

OTHER PUBLICATIONS

Chang, Chin-Chih et al.; Personalized Service Provision in a Context-Aware Shopping Environment; 2012 Fourth International Conference on Computational Intelligence, Communication Systems and Networks; Jul. 24-26, 2012; pp. 103-108.

Wang, Yuqi et al.; The application of factorization machines in user behavior prediction; 2016 IEEE/ACIS 15th International Conference on Computer and Information Science; Jun. 26-29, 2016; 4 pages.

Management Center: Marketing Tool; retrieved from the Internet Jun. 6, 2017; URL: https://www.ibm.com/support/knowledgecenter/en/SSZLC2_8.0.0/com.ibm.commerce.management-center.doc/concepts/csbmarketingtools.htm?view=embed; 6 pages.

\* cited by examiner

US 10,776,576 B2

AUTOMATED MOBILE DEVICE DETECTION

FIELD

The present invention relates generally to a method for automatically detecting a mobile hardware device and in particular to a method and associated system for improving online Website software technology associated with modifying Webpages based on information retrieved via multiple hardware sensors of a mobile hardware device.

BACKGROUND

Accurately detecting a user's physical actions, movements, and behavior using mobile devices typically includes an inaccurate process with little flexibility. Determining how to exploit the user's physical actions, movements, and behavior associated with online solutions with respect to Web features may include a complicated process that may be time consuming and require a large amount of resources. Accordingly, there exists a need in the art to overcome at least some of the deficiencies and limitations described herein above.

SUMMARY

A first aspect of the invention provides an automated mobile device detection improvement method comprising: automatically detecting, by a processor of a mobile hardware device of a user, a first plurality of Web pages being accessed by said user via said mobile hardware device; automatically detecting, by said processor via a plurality of hardware sensors of said mobile hardware device, movement based attributes of said user; automatically detecting, by said processor via said plurality of hardware sensors, biological parameters of said user; automatically detecting, by said processor via said plurality of hardware sensors, a geographical location of said user; analyzing, by said processor, said first plurality of Web pages with respect to said movement based attributes, said biological parameters, and said geographical location; and modifying, by said processor based on results of said analyzing, said first plurality of Webpages such that a modified plurality of Webpages is generated; and presenting, by said processor to said user, said modified plurality of Webpages.

A second aspect of the invention provides a computer program product, comprising a computer readable hardware storage device storing a computer readable program code, said computer readable program code comprising an algorithm that when executed by a processor of a mobile hardware device implements an automated mobile device detection improvement method, said method comprising: automatically detecting, by said processor, a first plurality of Web pages being accessed by said user via said mobile hardware device; automatically detecting, by said processor via a plurality of hardware sensors of said mobile hardware device, movement based attributes of said user; automatically detecting, by said processor via said plurality of hardware sensors, biological parameters of said user; automatically detecting, by said processor via said plurality of hardware sensors, a geographical location of said user; analyzing, by said processor, said first plurality of Web pages with respect to said movement based attributes, said biological parameters, and said geographical location; and modifying, by said processor based on results of said analyzing, said first plurality of Webpages such that a modified plurality of Webpages is generated; and presenting, by said processor to said user, said modified plurality of Webpages.

A third aspect of mobile hardware device comprising a processor coupled to a computer-readable memory unit, said memory unit comprising instructions that when executed by the computer processor implements an automated mobile device detection improvement method comprising: automatically detecting, by said processor, a first plurality of Web pages being accessed by said user via said mobile hardware device; automatically detecting, by said processor via a plurality of hardware sensors of said mobile hardware device, movement based attributes of said user; automatically detecting, by said processor via said plurality of hardware sensors, biological parameters of said user; automatically detecting, by said processor via said plurality of hardware sensors, a geographical location of said user; analyzing, by said processor, said first plurality of Web pages with respect to said movement based attributes, said biological parameters, and said geographical location; and modifying, by said processor based on results of said analyzing, said first plurality of Webpages such that a modified plurality of Webpages is generated; and presenting, by said processor to said user, said modified plurality of Webpages.

The present invention advantageously provides a simple method and associated system capable of accurately detecting a users' physical actions, movements, and behavior via mobile devices, and exploiting that information to optimize an online browsing or shopping experience.

DETAILED DESCRIPTION

Figure 1:
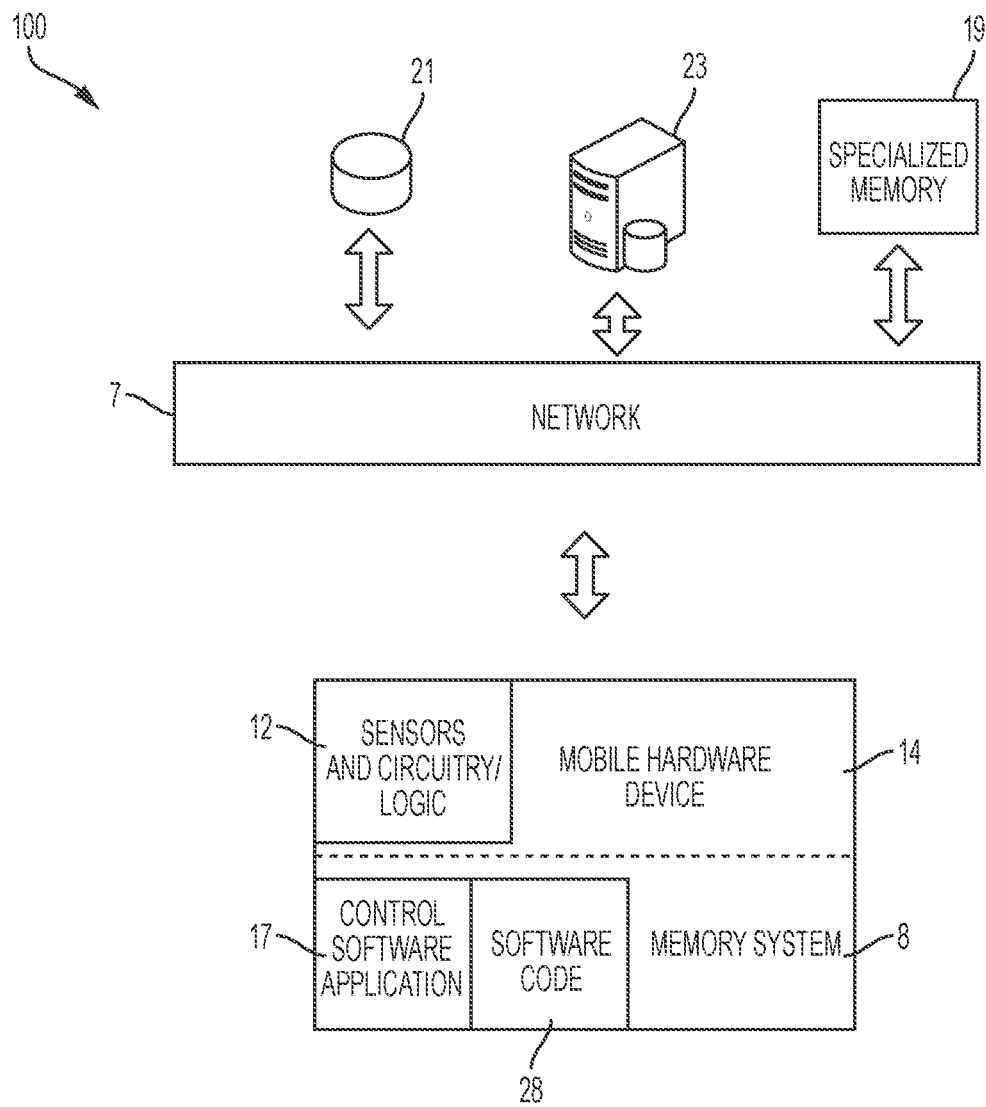
FIG. 1 illustrates a system for improving online Website software technology associated with modifying Webpages based on information retrieved via multiple hardware sensors of a mobile hardware device, in accordance with embodiments of the present invention.

FIG. 1 illustrates a system 100 for improving online Website software technology associated with modifying Webpages based on information retrieved via multiple hardware sensors of a mobile hardware device 14, in accordance with embodiments of the present invention. System 100 is enabled to detect mobile hardware devices (e.g., mobile hardware device 14) and present associated Webpages based on sensed attributes of a user. Mobile hardware device 14 is initially configured by a server 23 (e.g., a Webpage server) thereby enabling changes to a predetermined range of Webpages presented to the user. The predetermined range of Webpages are executed and presented in response to online behavior of the user. For example, the predetermined range of Webpages may be executed based on: detection (e.g., via sensors/logic 12) and reaction to visited Webpages, Website search entered online, modifications to a configuration associated with user for increasing the predetermined range of changes by enabling server 23 to select associated software behaviors, sensed conditions, mood, or location of the user, or any combination thereof.

System 100 of FIG. 1 includes a server (or hardware system), a specialized memory device (or system) 19, and a database system 21 connected through a network 7 to a mobile hardware device 14. Mobile hardware device 14 comprises sensors and circuitry/logic 12 and a (specialized) memory system 8. Memory system 8 comprises a control software application 17 and software code 28. Memory system 8 may include a single memory system. Alternatively, memory system 8 may include a plurality of memory systems. Server 23, database system 21, and mobile hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 23, database system 21, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry (e.g., sensors and circuitry/logic 12, etc.) may include proprietary specially designed components (e.g., a specialized integrated circuit, such as for example an Application Specific Integrated Circuit (ASIC) designed for only implementing a process for improving online Website software technology associated with modifying Webpages based on information retrieved via multiple hardware sensors of a mobile hardware device 14. Sensors and circuitry/logic 12 may include sensors including accelerometers (for determining an orientation, a pattern of movement, and a location of mobile hardware device), light detection sensors, a barometer sensor, and audio sensors; GPS sensors, optical sensors, heart rate sensors, temperature sensors, etc. Network 7 may include any type of network including, inter alia, a local area network, (LAN), a wide area network (WAN), the Internet, a wireless network, etc.

System 100 utilizes sensors and circuitry/logic 12 to determine user environment, actions, and behavior thereby allowing control and management of Webpage execution and presentation. For example, system 100 may enable a user to select differing sets of search results based on sensed conditions of the user (e.g., is the user detected to be at rest or walking as determined by device accelerometers). Multiple differing Webpage search results and/or Webpages or customized content may be presented based on a detected (i.e., via sensors) mood of the user thereby auto configuring Webpage presentation. System 100 enables two processes as follows:

A first process enables an authorized user to execute a wide range of Website changes in response detection of user online behavior. For example, server 23 (of the authorized user) dynamically detects and reacts to: user visited Webpages, entered Webpage search terms, etc. Therefore, a wide range of behavioral and environmental observations may be exposed to server 23 thereby enabling a process for configuring how a Website responds selected Webpages.

A second process enables mobile hardware device 14 to execute internal sensors (e.g., sensors and circuitry/logic 12) to detect user conditions and attributes during Website execution. If a mobile web browser is being used, then a plugin library and/or downloaded JavaScript code may be used to detect and measure sensor readings (of sensors and circuitry/logic 12). All detected information from the sensors is transmitted automatically to server 23 via, inter alia, a process for encoding the information into a JSON packet and transmitting the packet to a REST API exposed by server 23. During a runtime process (i.e., during a Webpage search process), hardware mobile device 14 retrieves sensor information and transmits the sensor information to server 23. In response, server 23 combines the sensor information with the setup and configuration software code for dynamically generating Website search and presentation code optimized for a current user of the Website.

Figure 2:
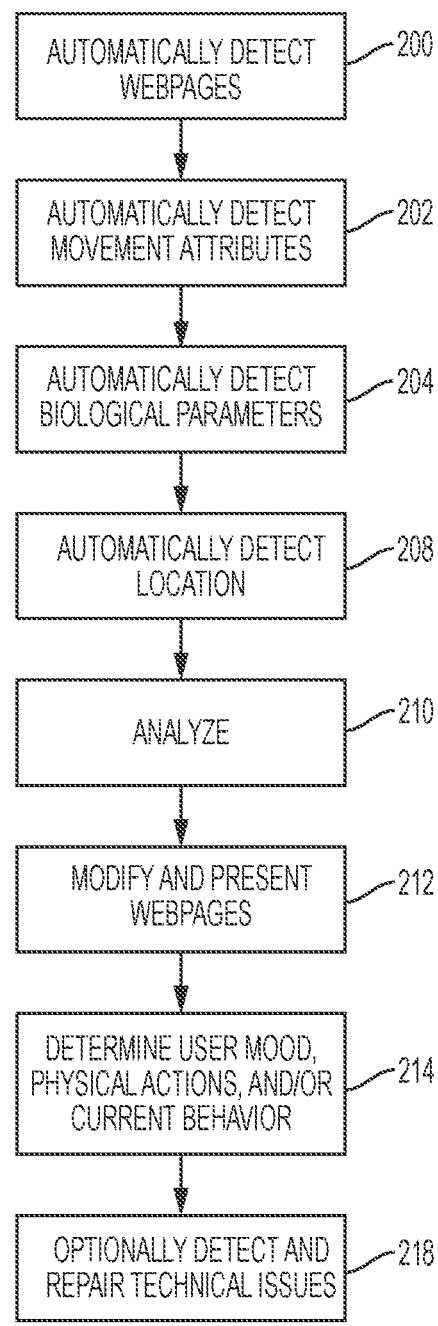
FIG. 2 illustrates an algorithm detailing a process flow enabled by the system of FIG. 1 for improving online Website software technology associated with modifying Webpages based on information retrieved via multiple hardware sensors of a mobile hardware device, in accordance with embodiments of the present invention.

FIG. 2 illustrates an algorithm detailing a process flow enabled by system 100 of FIG. 1 for improving online Website software technology associated with modifying Webpages based on information retrieved via multiple hardware sensors of a mobile hardware device, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by mobile hardware device 14 and server 23 of FIG. 1. In step 200, a first plurality of Web pages being accessed by a user via a mobile hardware device are automatically detected. In step 202, movement based attributes of the user are automatically detected via hardware sensors of the mobile hardware device. In step 204, biological parameters of the user are automatically detected via the hardware sensors. In step 208, a geographical location of the user is automatically detected via the hardware sensors. In step 210, the first plurality of Web pages are analyzed with respect to the movement based attributes, the biological parameters, and the geographical location. Results of the analysis may be hardcoded within the mobile hardware device. In step 212, the first plurality of Webpages are modified (based on results of the analyses of step 210) such that a modified plurality of Webpages is generated. The modified plurality of Webpages is presented to the user via a specialized graphical user interface (GUI). The modified plurality of Webpages may include a second plurality of Web pages differing from the first plurality of Web pages. Additionally, a first Webpage of the second plurality of Web pages may be linked to a second Webpage such that the second Webpage is presented to the user via said the Webpage. Alternatively, the modified plurality of Webpages may include modifications to specified content of the first plurality of Web pages. The modifications may include enabling a set of differing actions with respect to actions enabled by the first plurality of Web pages. Additionally, the user may control the first plurality of Web pages and may define rules (implemented via executable code) configured to dynamically control the modified plurality of Web pages. The rules may be influenced by the hardware sensors. In step 214, a mood of the user, physical actions of the user, and a current behavior of the user are determined based on results of the analyses of step 210. Additionally, the modified plurality of Web pages are presented to the user based on the mood, physical actions, and current behavior of the user. In optional step 218, a malfunction associated with the mobile hardware device is detected. In response, the mobile hardware device is automatically connected to a hardware system for repair and technical issues with the mobile hardware device are automatically diagnosed. Additionally, the technical issues with the mobile hardware device are automatically repaired.

Figure 3:
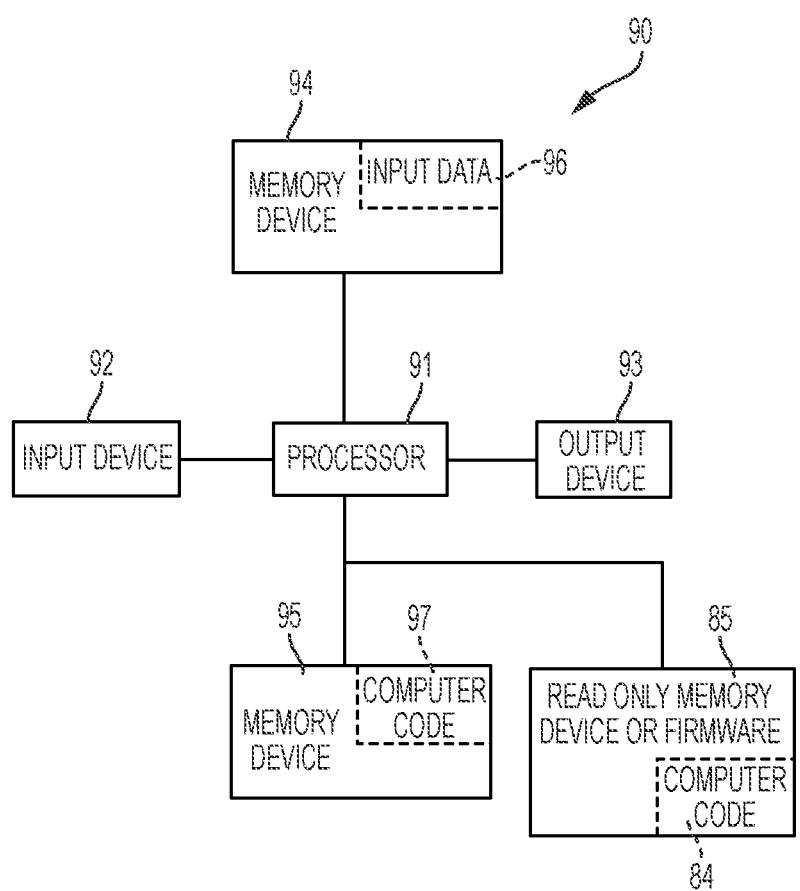
FIG. 3 illustrates a computer system used by the system of FIG. 1 for enabling a process for improving online Website software technology associated with modifying Webpages based on information retrieved via multiple hardware sensors of a mobile hardware device, in accordance with embodiments of the present invention.

FIG. 3 illustrates a computer system 90 (e.g., hardware device 14 and server 23 of FIG. 1) used by or comprised by the system of FIG. 1 for improving online Website software technology associated with modifying Webpages based on information retrieved via multiple hardware sensors of a mobile hardware device, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving online Website software technology associated with modifying Webpages based on information retrieved via multiple hardware sensors of a mobile hardware device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve online Website software technology associated with modifying Webpages based on information retrieved via multiple hardware sensors of a mobile hardware device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving online Website software technology associated with modifying Webpages based on information retrieved via multiple hardware sensors of a mobile hardware device. In another embodiment, the invention provides a business method that performs the process steps of the invention on a subscription, advertising, and/or fee basis. That is, a service supplier, such as a Solution Integrator, could offer to enable a process for improving online Website software technology associated with modifying Webpages based on information retrieved via multiple hardware sensors of a mobile hardware device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

Figure 4:
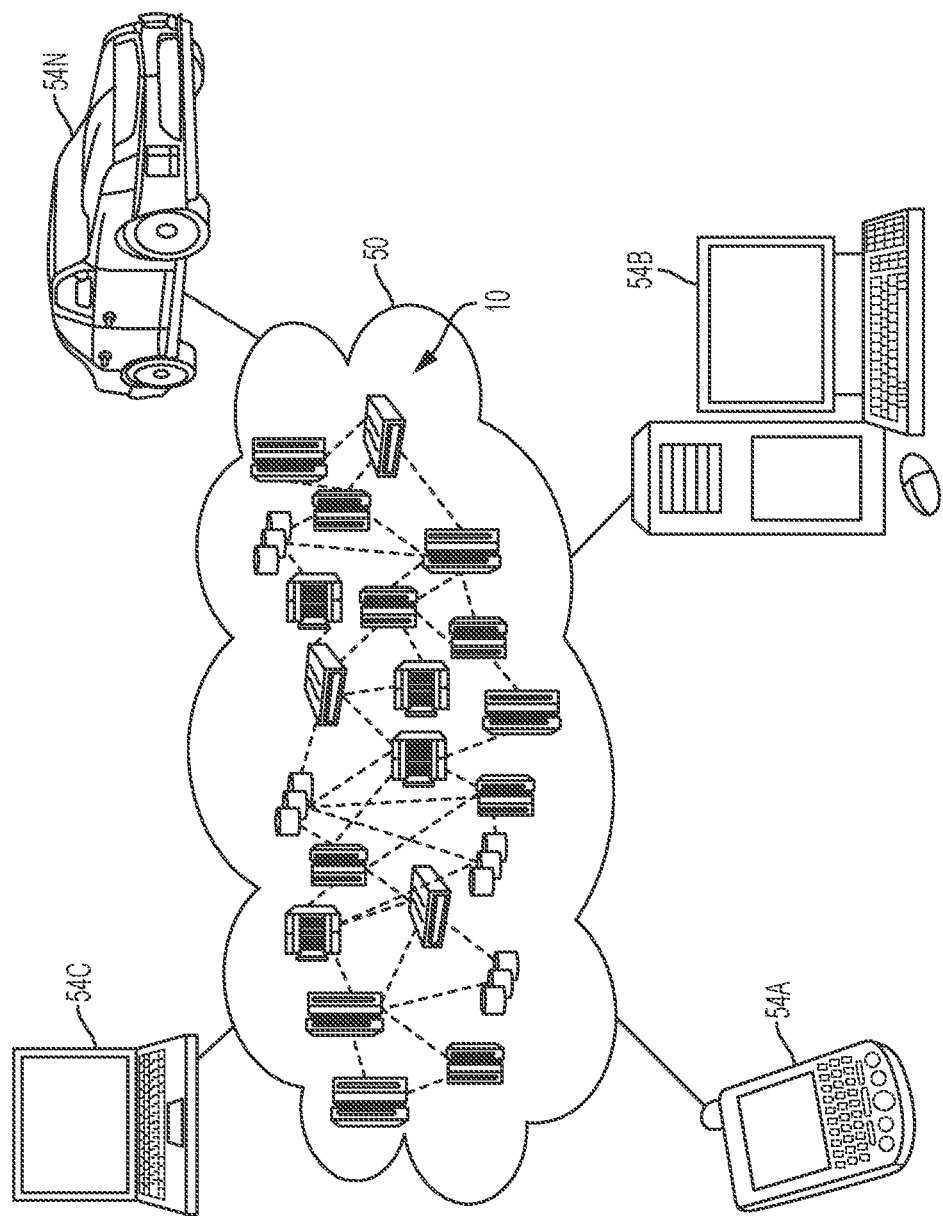
FIG. 4 illustrates a cloud computing environment, in accordance with embodiments of the present invention.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
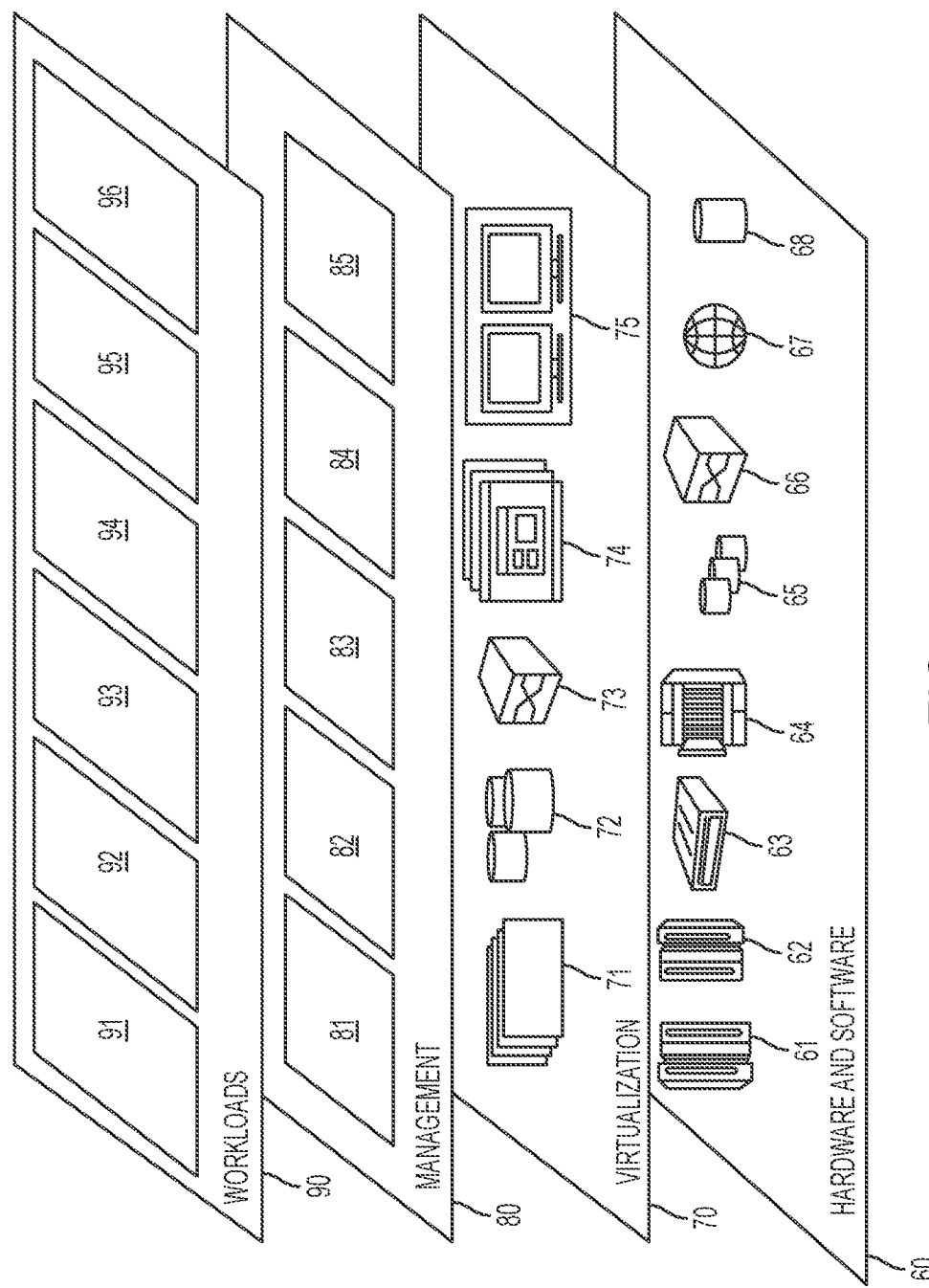
FIG. 5 illustrates a set of functional abstraction layers provided by cloud computing environment, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving online Website software technology associated with modifying Webpages based on information retrieved via multiple hardware sensors of a mobile hardware device 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated mobile device detection improvement method comprising:
   automatically detecting, by a processor of a mobile hardware device of a user, a first plurality of Web pages being accessed during a runtime process executed by said user via said mobile hardware device;
   automatically detecting, by said processor via a plurality of hardware sensors of said mobile hardware device, movement based attributes of said user, wherein said automatically detecting said movement based attributes comprises detecting, via an accelerometer, if said user is currently at rest or is currently walking;
   automatically detecting, by said processor via said plurality of hardware sensors, biological parameters, comprising a heartrate and a temperature, of said user;
   automatically detecting, by said processor via said plurality of hardware sensors, a geographical location of said user;
   automatically detecting, by said processor via said plurality of hardware sensors, a current behavior of said user;
   automatically detecting, by said processor via said plurality of hardware sensors, a current mood of said user;
   analyzing, by said processor, said first plurality of Web pages with respect to said movement based attributes, said biological parameters, said current behavior, said current mood, and said geographical location;
   hardcoding, by said processor, results of said analyzing into said mobile hardware device;
   encoding, by said processor, results of said analyzing into a JSON packet;
   transmitting, by said processor, said JSON packet to an API exposed by a server;
   combining, by said processor via said server, said movement based attributes, said biological parameters, said current behavior, said current mood, and said geographical location with setup and configuration software code;
   dynamically generating, by said processor, Website search and presentation code optimized for said user;
   modifying, by said processor executing said Website search and presentation code with respect to results of said analyzing, said encoding, and said transmitting, said first plurality of Webpages such that a modified plurality of Webpages is generated;
   presenting, by said processor to said user, said modified plurality of Webpages;
   defining, by said processor, rules influenced by said plurality of hardware sensors; and
   dynamically controlling, by said processor executing said rules, said modified plurality of Web pages.

2. The method of claim 1, wherein said modified plurality of Webpages comprises a second plurality of Web pages differing from said first plurality of Web pages.

3. The method of claim 2, wherein a first Webpage of said second plurality of Web pages is linked to a second Webpage such that said second Webpage is presented to said user via said first Webpage.

4. The method of claim 1, wherein said modified plurality of Webpages comprises modifications to specified content of said first plurality of Web pages.

5. The method of claim 4, wherein said modifications comprise enabling a set of differing actions with respect to actions enabled by said first plurality of Web pages.

6. The method of claim 1, wherein said plurality of hardware sensors comprise sensors selected from the group consisting of accelerometers, GPS sensors, optical sensors, barometers, heart rate monitors, audio sensors, and temperature sensors.

7. The method of claim 1, further comprising:
   determining, by said processor based on said results of said analyzing, physical actions of said user, wherein said modified plurality of Web pages is presented to said user based on said physical actions.

8. The method of claim 1, further comprising:
   determining, by said processor based on said results of said analyzing, a current behavior of said user, wherein said modified plurality of Web pages is presented to said user based on said current behavior.

9. The method of claim 1, wherein said rules are influenced by said plurality of hardware sensors selected from the group consisting of accelerometers, GPS sensors, optical sensors, barometers, heart rate monitors, audio sensors, and temperature sensors.

10. The method of claim 1, further comprising:
    determining, by said processor, a malfunction associated with said mobile hardware device;
    automatically connecting, by said processor, said mobile hardware device to a hardware system for repair;
    automatically diagnosing, by said processor, technical issues with said mobile hardware device;
    automatically repairing, by said processor, said technical issues with said mobile hardware device.

11. The method of claim 1, wherein results of said analyzing are hard coded within said mobile hardware device.

12. The method of claim 1, further comprising:
    providing at least one support service for at least one of creating, integrating, hosting, maintaining, and deploying computer-readable code in the control hardware, said code being executed by the computer processor to implement: said automatically detecting said plurality of Web pages, said automatically detecting said movement based attributes, said automatically detecting said biological parameters, said analyzing, said modifying, and said presenting.

13. A computer program product, comprising a computer readable hardware storage device storing a computer readable program code, said computer readable program code comprising an algorithm that when executed by a processor of a mobile hardware device implements an automated mobile device detection improvement method, said method comprising:
    automatically detecting, by said processor, a first plurality of Web pages being accessed during a runtime process executed by said user via said mobile hardware device;
    automatically detecting, by said processor via a plurality of hardware sensors of said mobile hardware device, movement based attributes of said user, wherein said automatically detecting said movement based attributes comprises detecting, via an accelerometer, if said user is currently at rest or is currently walking;
    automatically detecting, by said processor via said plurality of hardware sensors, biological parameters, comprising a heartrate and a temperature, of said user;

automatically detecting, by said processor via said plurality of hardware sensors, a geographical location of said user;
automatically detecting, by said processor via said plurality of hardware sensors, a current behavior of said user;
automatically detecting, by said processor via said plurality of hardware sensors, a current mood of said user;
analyzing, by said processor, said first plurality of Web pages with respect to said movement based attributes, said biological parameters, said current behavior, said current mood, and said geographical location;
hardcoding, by said processor, results of said analyzing into said mobile hardware device;
encoding, by said processor, results of said analyzing into a JSON packet;
transmitting, by said processor, said JSON packet to an API exposed by a server;
combining, by said processor via said server, said movement based attributes, said biological parameters, said current behavior, said current mood, and said geographical location with setup and configuration software code;
dynamically generating, by said processor, Website search and presentation code optimized for said user;
modifying, by said processor executing said Website search and presentation code with respect to results of said analyzing, said encoding, and said transmitting, said first plurality of Webpages such that a modified plurality of Webpages is generated;
presenting, by said processor to said user, said modified plurality of Webpages;
defining, by said processor, rules influenced by said plurality of hardware sensors; and
dynamically controlling, by said processor executing said rules, said modified plurality of Web pages.

14. The computer program product of claim 13, wherein said modified plurality of Webpages comprises a second plurality of Web pages differing from said first plurality of Web pages.

15. The computer program product of claim 14, wherein a first Webpage of said second plurality of Web pages is linked to a second Webpage such that said second Webpage is presented to said user via said first Webpage.

16. The computer program product of claim 13, wherein said modified plurality of Webpages comprises modifications to specified content of said first plurality of Web pages.

17. The computer program product of claim 16, wherein said modifications comprise enabling a set of differing actions with respect to actions enabled by said first plurality of Web pages.

18. A mobile hardware device comprising a processor coupled to a computer-readable memory unit, said memory unit comprising instructions that when executed by the computer processor implements an automated mobile device detection improvement method comprising:
automatically detecting, by said processor, a first plurality of Web pages being accessed during a runtime process executed by said user via said mobile hardware device;
automatically detecting, by said processor via a plurality of hardware sensors of said mobile hardware device, movement based attributes of said user, wherein said automatically detecting said movement based attributes comprises detecting, via an accelerometer, if said user is currently at rest or is currently walking;
automatically detecting, by said processor via said plurality of hardware sensors, biological parameters, comprising a heartrate and a temperature, of said user;
automatically detecting, by said processor via said plurality of hardware sensors, a geographical location of said user;
automatically detecting, by said processor via said plurality of hardware sensors, a current behavior of said user;
automatically detecting, by said processor via said plurality of hardware sensors, a current mood of said user;
analyzing, by said processor, said first plurality of Web pages with respect to said movement based attributes, said biological parameters, said current behavior, said current mood, and said geographical location;
hardcoding, by said processor, results of said analyzing into said mobile hardware device;
encoding, by said processor, results of said analyzing into a JSON packet;
transmitting, by said processor, said JSON packet to an API exposed by a server;
combining, by said processor via said server, said movement based attributes, said biological parameters, said current behavior, said current mood, and said geographical location with setup and configuration software code;
dynamically generating, by said processor, Website search and presentation code optimized for said user;
modifying, by said processor executing said Website search and presentation code with respect to results of said analyzing, said encoding, and said transmitting, said first plurality of Webpages such that a modified plurality of Webpages is generated;
presenting, by said processor to said user, said modified plurality of Webpages;
defining, by said processor, rules influenced by said plurality of hardware sensors; and
dynamically controlling, by said processor executing said rules, said modified plurality of Web pages.

* * * * *